United States Patent [19]

Iguchi et al.

[11] Patent Number: 4,561,050
[45] Date of Patent: Dec. 24, 1985

[54] METHOD OF DETERMINING COORDINATE SYSTEM IN MACHINING CENTER

[75] Inventors: Hideaki Iguchi, Konan; Takayoshi Sakai, Kagamihara; Hajime Ohashi, Inuyama, all of Japan

[73] Assignee: Yamazaki Machinery Works, Ltd., Aichi, Japan

[21] Appl. No.: 442,085

[22] Filed: Nov. 16, 1982

[30] Foreign Application Priority Data

Nov. 25, 1981 [JP] Japan ............................ 56-188953

[51] Int. Cl.<sup>4</sup> ........................................... G05B 19/18
[52] U.S. Cl. ..................... 364/167; 364/474; 364/170; 364/192; 318/568; 408/13
[58] Field of Search .............. 364/474, 167, 168, 169, 364/170, 171, 191, 192, 193, 513; 318/568; 408/13

[56] References Cited

U.S. PATENT DOCUMENTS

| | | | |
|---|---|---|---|
| 3,866,027 | 2/1975 | Cutler et al. | 364/474 X |
| 4,011,437 | 3/1977 | Hohn | 364/192 |
| 4,178,632 | 12/1979 | Anthony | 364/192 X |
| 4,243,923 | 1/1981 | Whitney et al. | 364/167 X |
| 4,296,364 | 10/1981 | Fukuyama et al. | 364/474 X |
| 4,380,696 | 4/1983 | Masaki | 364/513 X |
| 4,453,221 | 6/1984 | Davis et al. | 364/191 X |
| 4,456,961 | 6/1984 | Price et al. | 364/192 X |

Primary Examiner—Jerry Smith
Assistant Examiner—Allen MacDonald
Attorney, Agent, or Firm—Cushman, Darby & Cushman

[57] ABSTRACT

A method of determining coordinate system in a machining center in which tool exchange is made after resetting the tool to the mechanical zero point. A reference position is set with respect to a program zero point at a position on a coordinate having the origin coinciding with the program zero point. The mechanical coordinate values of the reference position with respect to the mechanical zero point are computed and determined by making a reference portion of the tool coincide with the reference position. Then, the mechanical coordinate values of the program zero point are computed and determined from the reference position. In the tool exchange, the mechanical coordinate value of the program zero point in the direction of axis of spindle is corrected in accordance with the difference of length between two tools, by reading the data concerning the tool lengths from a tool file storing the tool lengths in the direction of axis of the spindle. According to this method, it is possible to compute and determine the mechanical coordinate values of the program zero point without delay even when the tool is changed in the machining center.

4 Claims, 3 Drawing Figures

METHOD OF DETERMINING COORDINATE SYSTEM IN MACHINING CENTER

BACKGROUND OF THE INVENTION

The present invention relates in general to machining centers having a plurality of tools for successively machining a workpiece. More specifically, the invention provides an arrangement for automatically taking into account different lengths of successively used tools so as to relieve the operator of extensive "adjustment" each time one tool is exchanged for another.

Usually, in order to make the machining center perform the required machining, it is necessary to define a machining program. In defining the machining program, there is no means for knowing at what position a workpiece to be machined is positioned relative to the origin of mechanical coordinate axes (referred to as "MZP" (mechanical zero point), hereinafter). Therefore, an embodiment coordinate system is assumed for the purpose of defining the program. When machining is carried out, the mechanical coordinate values $Xo, Yo$ and $Zo$ of the origin of coordinate axes assumed in the program (referred to as "PZP" (program zero point), hereinunder), with respect to the mechanical zero point MZP in the direction of X and Y axes (parallel to the plane of the sheet in FIG. 1) and direction Z (perpendicular to the plane of the sheet in FIG. 1), are inputted to a machining center. In consequence, the coordinate values of the machining point in the program, expressed in terms of coordinate values with respect to the program zero point PZP, e.g. P1 $(x1,y1,z1)$ into mechanical coordinate values $(X1,Y1,Z1)$ with respecct to the mechanical zero point MZP, and the tool is moved to the mechanical coordinate position $(X1,Y1,Z1)$ to effect the required machining.

Hitherto, the inputting of the mechanical coordinate values $(Xo, Yo, Zo)$ of the program zero point PZP has been made by an operator by measuring the distance between the zero points PZP and MZP by a suitable method after mounting workpiece 3 on the machine. The measured distance is input via a key board or the like. According to this known method, it is necessary to measure the coordinate values $(Xo, Yo, Zo)$ before machining, resulting in an impractically long preparation time and burden on the operator.

According to another method proposed hitherto, the coordinate values $(Xo, Yo, Zo)$ are beforehand determined to eliminate the necessity of the operator measuring the distance. This method, however, requires the mounting of workpiece 3 on the machine at an impractically high precision, requiring much time and labor.

In a single-purposed machine which does not employ any tool exchange such as numerical control drilling machine, it is possible to conduct the machining by making use of the initial tool set position as the program zero point PZP. However, this method cannot apply to a machining center which employs various tools having a variety of lengths in the direction of an axis of the spindle of the machining center, i.e. in the direction of Z axis, because it is not possible to return the tool to the program zero point PZP if the reach of a particular tool is different from that of a preceding tool as a result of tool exchange. Therefore, the operator is obliged to measure and input the coordinate position $(Xo, Yo, Zo)$ each time a tool is exchanged or to move the tool to the program zero point PZP by a manual instruction and to make a new registration of the zero point PZP, although actually such a registration is often made impossible due to the process of machining. Therefore, it has been impractical to adapt the control method used for single-purposed machines to the control of tool position in a multi-tool machining center.

This problem is serious particularly when attempting a small-amount of machining of a workpiece 3 having a comparatively simple configuration with the program zero point PZP scribed directly on the work. In such a case, machining efficiency is decreased undesirably due to the necessity for measuring and inputting the aforementioned coordinate values $(Xo, Yo, Zo)$, which delays the operator in starting machining.

SUMMARY OF THE INVENTION

Accordingly, an object of the invention is to provide a method of determining a coordinate system in a machining center which, regardless of a tool exchange, eliminates the need to improve a program zero point PZP on the mechanical coordinate system and the repeat registration of the program zero point PZP, so that the preparation time is shortened and the operator is unburdened thereby overcoming the above-described problems of the prior art.

Another object of the invention is to provide a method of determining a coordinate system in a machining center improved to eliminate the necessity for the impractically high precision of the mounting of the work with respect to the mechanical zero point MZP.

Still another object of the invention is to provide a method of determining a coordinate system in a machining center improved to permit the operator to begin machining immediately after the program zero point PZP is scribed on the work.

To accomplish these objectives, the invention provides an arrangement (including apparatus and method) for determining a coordinate system in a machining center comprising: setting a reference position with respect to a program zero point at a predetermined position on a coordinate having an origin coinciding with the program zero point, computing and determining the mechanical coordinate values of the reference position with respect to a mechanical zero point by making the position of a reference portion of the tool coincide with the reference position, computing and determining the mechanical coordinate values of the program zero point from the reference position, and correcting, when the tool is exchanged, the mechanical coordinate values of the program zero point in accordance with the difference of length between two tools, by reading the data concerning the tool length from a tool file storing lengths of tools in the direction of axis of the spindle of the machine tool.

DESCRIPTION OF THE PREFERRED EMBODIMENT

A preferred embodiment of the invention will be described hereinunder with reference to the accompanying drawings.

Figure 3:
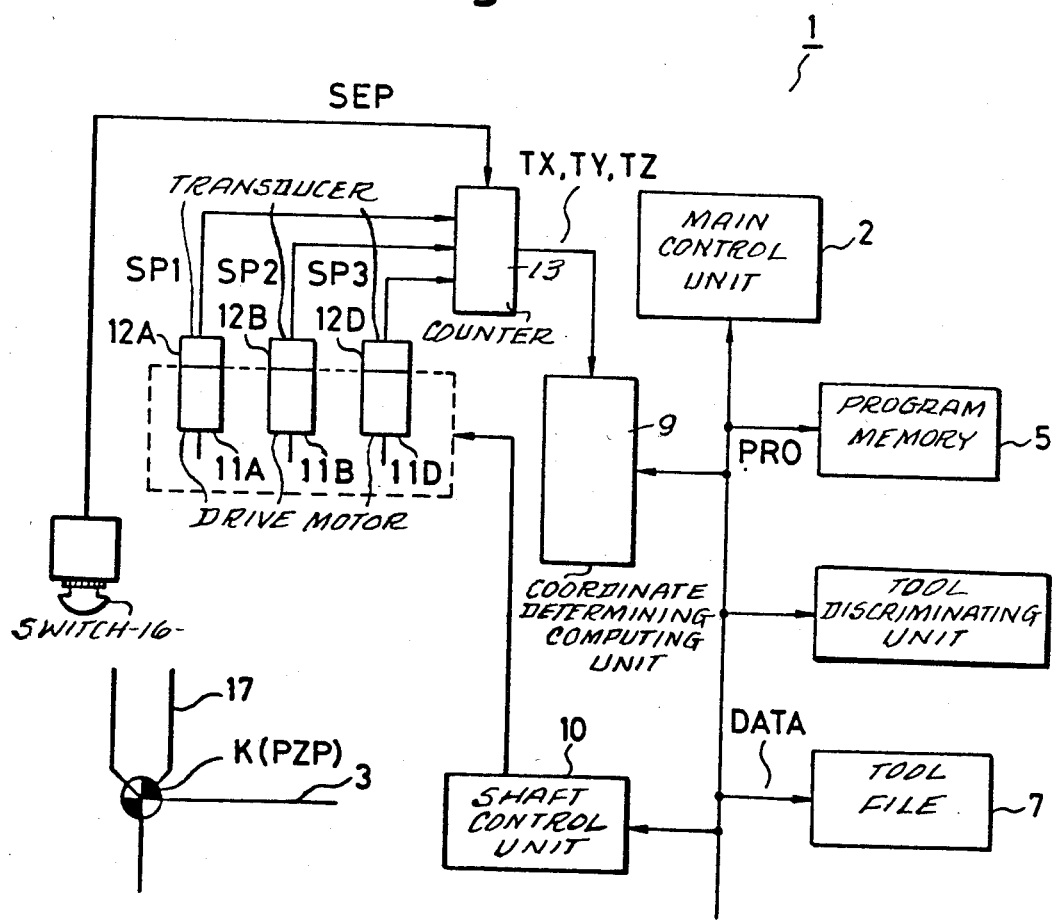
FIG. 3 is a control block diagram of an example of a machining center to which the invention is applied.

As will be seen from FIG. 3, a machining center 1 is provided with a main control unit 2 to which connected are a program memory 5 storing a machining program formed on the basis of a program zero point PZP, tool discriminating unit 6, tool file 7 storing tool data DATA such as length of tools used in the machining, tool diameter and so forth, coordinate determining computing unit 9, shaft control unit 10 and so forth.

Drive motors 11A,11B and 11D for driving X,Y and Z shafts, respectively, are connected to the shaft control unit 10. These drive motors 11A,11B and 11D are provided with transducers 12A,12B and 12D adapted to produce position pulses SP1,SP2,SP3 synchronous with rotation of shafts of the drive motors 11A,11B and 11D. These transducers 12A,12B,12D are connected to the coordinate determining computing unit 9 through a counter 13 to which is also connected a push button switch 16.

Figure 1:
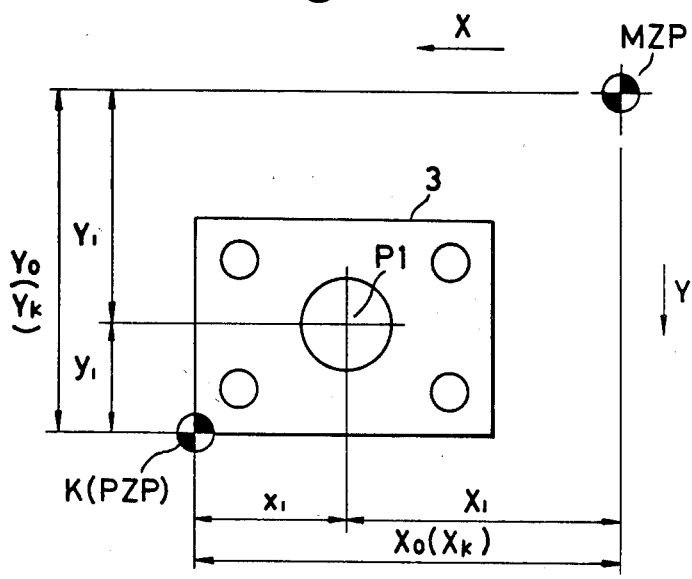
FIGS. 1 and 2 are plan views showing the positional relationship between a mechanical zero point and a program zero point.

In operation of the machining center 1 having the described construction, the operator moves the tool 17 from the mechanical zero point MZP shown in FIG. 1 to a reference position K scribed on the work 3 and appointed in the machining drawings to make a reference portion, e.g. tip end of the tool 17, coincide with the reference position K.

The movement of the tool 17 is effected by rotating the shafts of the drive motors 11A,11B,11D in accordance with the instructions given by the main control unit 2 through the shaft control unit 10. During the movement of the tool 17, the transducers 12A,12B,12D produce position pulses SP1,SP2,SP3 in synchronization with the rotation of respective motor shafts, so that the position of the tool 17 with respect to the mechanical zero point MZP can be known by suitably adding and subtracting the number of pulses by the counter 13 taking into account the directions of rotation of respective motor shafts of the motors 11A,11B and 11D. When the tool has reached the point where the position of the reference portion thereof concides with the reference position K, the operator pushes the push button switch 16 so that a set pulse SEP is delivered by the switch 16 to the counter 13. The counter 13 then latches the pulse numbers TX,TY,TZ of the pulses SP1,SP2,SP3 acquired for the motors 11A,11B,11D, respectively, at the moment of delivery of the set pulse SEP. The latched values are delivered to the coordinate determining computing unit 9.

Upon receipt of the pulse numbers TX,TY and TZ, the computing unit 9 computes the mechanical coordinate values (Xk,Yk,Zk) of the reference position K of workpiece 3, and regards this reference position K as being the program zero point PZP having a coordinate values (Xo(=Xk),Yo(=Yk),Zo(Zk)) thereby to determine a coordinate system having the origin coinciding with the zero point PZP.

After the determination of this coordinate system, the main control unit 2 gives an instruction to start the actual machining. In response to this instruction, the computing unit 9 reads the machining program PRO formed on the basis of the program zero point PZP out of the program memory 5, and converts the coordinate values (xl,yl,zl) of the point P1 in FIG. 1 in the program PRO into the mechanical coordinate values (Xl,Yl,Zl) using the coordinate values (Xo,Yo,Zo) of the program zero point PZP. Then, the shaft control unit 10 energizes the drive motors 11A,11B and 11D in accordance with the computed mechanical coordinate values (Xl,Yl,Zl) thereby to move the tool 17 to the point P1 which represents the machining position.

Thus, the steps of the machining program PRO are successively executed in terms of the mechanical coordinate values (X,Y,Z).

When there is a tool exchange demand after the completion of machining with a tool 17, the tool 17 is forcibly returned together with the spindle holding the tool 17 to the mechanical zero point MZP. Meanwhile, the tool discriminating unit 6 discriminates the tool 17 to be substituted for the present tool 17, and reads length L1 of the tool 17 in the Z-axis direction, i.e. in the direction of the spindle carrying the tool 17. The thus read out length L1 is delivered to the computing unit 9. The computing unit 9 then compares the length L1 with the length L2 of the tool which was used in the setting of the mechanical coordinate values (Xo,Yo,Zo) of the program zero point PZP. When the lengths L1 and L2 are not equal to each other, the mechanical coordinate value Zo of the program zero point PZP in the Z-axis direction is changed after the exchange of the tool 17. It is, therefore, necessary to correct the coordinate value Zo in conformity with the length L1 of the new tool. Namely, the mechanical coordinate values (Xo,Yo,Zo) of the program zero point PZP is determined by the distance of movement of the tool 17 with respect to the mechanical zero point MZP when the reference portion of the tool 17 is moved into conformity with the reference position K. Therefore, any change in the tool length $L_1, L_2$ in the direction of the spindle axis naturally causes a change in the distance of movement in the Z-axis direction to the reference position K, i.e. the pulse number TZ and, hence, the coordinate value Zo.

After the completion of the tool exchange, the main control unit 2 returns the tool 10 through the operation of the shaft control unit 10 to the program zero point PZP in accordance with the corrected coordinate value Zo and turns right away to the next step of machining in accordance with the machining program PRO. Needless to say, no correction of the coordinate value Zo is necessary when the tool length L1 equals to the tool length L2.

Figure 2:
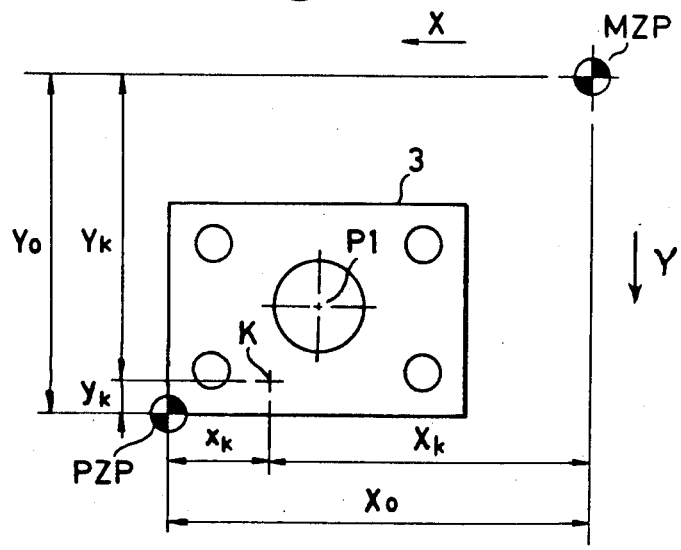

In the embodiment described hereinbefore in connection with FIG. 1, the reference position K is set in conformity with the program zero point PZP and the mechanical coordinate values (Xk,Yk,Zk) of the reference position K is used as the mechanical coordinate values. (Xo,Yo,Zo) of the program zero point PZP. This, however, is not exclusive and, as will be clear to those skilled in the art, the mechanical coordinate values (Xo,Yo,Zo) of the program zero point PZP may be computed and determined in the following manner. Referring to FIG. 2, the reference position K is set at a predetermined position (xk,yk,zk) on a coordinate system having the origin on the program zero point PZP, and the mechanical coordinate values (Xk,Yk,Zk) of the reference position K are computed and determined through obtaining a coincidence between the reference position K and the reference portion of the tool 17. In this computation, the above-mentioned coordinate values (xk,yk,zk) are inputted to the coordinate determining computing unit 9 by a suitable inputting means such as the machining program PRO or the key board to make the unit 9 compute and determine the mechanical coordinate values (Xo,Yo,Zo) of the program zero point PZP.

As has been described, according to the invention, the mechanical coordinate values (Xk,Yk,Zk) of a reference position K are computed and determined by setting the reference position K with respect to the program zero point at a position (xk,yk,zk) on a coordinate system having the origin coinciding with the program zero point PZP and then making the position of a reference portion of the tool 17 coincide with the reference position K. Then, the mechanical coordinate values (Xo,Yo,Zo) of the program zero point PZP are computed and determined from the reference position K. In addition, when the tool is exchanged, the mechanical coordinate value Zo of the program zero point PZP is corrected in accordance with the difference between the lengths L1 and L2 of the tools which are exchanged with each other.

It is, therefore, possible to completely eliminate the troublesome work of manual measurement of the mechanical coordinate values (Xo,Yo,Zo) of the program zero point PZP by the operator, as well as repeated registration of the program zero point PZP, at each time of the tool exchange.

Thus, the present invention affords a remarkable shortening of the preparation time and effectively unburden the operator.

Furthermore, since the mechanical coordinate values (Xo,Yo,Zo) of the program zero point PZP are determined after mounting the workpiece 3 on the machine, the operator is relieved of the troublesome workpiece of mounting the work 3 with an impractically high positional precision with respect to the machine zero point MZP, so that the mounting of the work 3 can be made promptly and easily. This advantage is remarkable particularly in a small-amount machining of a work having a comparatively simple configuration with the program zero point PZP scribed thereon because in such a case the machine can turn to the machining right away simply by making the tool position coincide with the program zero point PZP, i.e. by using the program zero point PZP as the reference position K to offer a remarkable improvement in the efficiency of the machining work.

By setting the reference position K in conformity with the program zero point PZP, the mechanical coordinate positions (Xk,Yk,Zk) of the reference position K, it is possible to directly obtain the coincidence of the mechanical coordinate values (Xk,Yk,Zk) of the reference position K with those (Xo,Yo,Zo) of the zero point PZP. By so doing, it is possible to eliminate the computation for determining the mechanical coordinate values of the program zero point PZP from the mechanical coordinate values of the reference position K and to attain a correspondingly faster determination of mechanical coordinate values of the zero point PZP which in turn promises a higher speed of control.

Although the invention has been described through specific terms, it is to be noted here that the described embodiments are only illustrative and not exclusive. The scope of the invention is not to be limited solely by the appended claims. Rather, all possible modifications covered by the claims are intended to be within the scope of the present invention.

What is claimed is:

1. A method of controlling a machining center for machining a workpiece successively with a plurality of tools of different lengths in the direction of a spindle axis of the machining center, wherein a particular tool coupled to the spindle is reset to a mechanical zero point origin of a mechanical coordinate axis after a tool exchange has been effected, the center including means for detecting mechanical coordinate values of the received tool with respect to said zero point, the method comprising the steps of:
   storing, in a tool file memory, length data indicative of the length of each tool;
   storing, in a program memory, a machining program defined with respect to a program zero point;
   setting a reference position with respect to said program zero point at a predetermined position on a coordinate system having an origin coinciding with said zero point;
   positioning a tool, coupled to said spindle, so as to coincide with said reference position;
   computing mechanical coordinate values of said reference position with respect to said mechanical zero point from information provided by said detecting means;
   computing mechanical coordinate values of said program zero point from said mechanical coordinate values of said reference position;
   correcting, when a tool is exchanged, the mechanical coordinate values of said program zero point in accordance with a difference of length between consecutively used tools, by reading tool length data from a tool file memory; and
   executing said machining program using the resulting corrected mechanical coordinate values.

2. A method according to claim 1, wherein said step of setting a reference position comprises the step of setting a reference position with respect to a program zero point scribed on the workpiece.

3. A machining center coordinate determining arrangement comprising:
   a spindle for rotating a tool coupled thereto for machining a workpiece, said spindle having an axis;
   a plurality of tools of different lengths in the direction of said spindle axis;
   means for coupling a tool of said plurality of tools to said spindle;
   means for resetting a particular tool coupled to the spindle to a zero point which is the origin of a mechanical coordinate axis after a tool exchange has been effected;
   means for detecting the mechanical coordinate values of a tool coupled to said spindle with respect to said mechanical zero point;
   a tool file memory for storing length data indicative of the length of each tool of said plurality of tools;
   a program memory for storing a machining program defined with respect to said program zero point;
   means for setting a reference position with respect to said program zero point at a predetermined position on a coordinate system having an origin coinciding with the program zero point;
   means for positioning a tool, coupled to said spindle, so as to coincide with said reference position;
   means for computing the mechanical coordinate values of said reference position with respect to said mechanical zero point from information provided by said detecting means;
   means for computing the mechanical coordinate values of said program zero point from said mechanical coordinate values of said reference position;
   means for correcting, when a tool is exchanged, the mechanical coordinate values of said program zero point in accordance with a difference of length between consecutively used tools by reading tool length data from said tool file memory; and means for executing said machining program using the resulting corrected mechanical coordinate values.

4. An arrangement according to claim 3 wherein said reference setting means comprises means for setting a reference position with respect to a program zero point scribed on a workpiece.

* * * * *